UNITED STATES PATENT OFFICE.

ADRIANO OSTROGOVICH, OF BUCHAREST, ROUMANIA, AND THEOPHILE SILBERMANN, OF CHARLOTTENBURG, GERMANY.

PROCESS OF PRODUCING INDULIN COLORS.

No. 900,302.          Specification of Letters Patent.          Patented Oct. 6, 1908.

Application filed February 8, 1907. Serial No. 356,404.

*To all whom it may concern:*

Be it known that we, ADRIANO OSTROGOVICH, chemist, and THEOPHILE SILBERMANN, diplom engineer, subjects of the King of Roumania, and residing, respectively, at Bucharest, Splaiul General Magheru 2, in the Kingdom of Roumania, and at Charlottenburg, Schillerstrasse 120, in the German Empire, have invented new and useful Improvements in Processes for Producing Indulin and Indulin-Like Colors, of which the following is a specification.

Our invention relates to a process for producing indulin and indulinlike colors by heating aromatic amins with halogen without addition of acid and has for its object to render the process more expeditious and considerably cheaper, while producing also better colors.

Up to the present, indulins have usually been produced in manufacture by fusing either amidoazo-compounds with aromatic amins and mineral acids or aromatic amins with mineral acids, iron and nitro-compounds, or of anilin with arsenic acid. These methods depend on oxidizing processes of the kind described by Schultz. The same may be said of the production of indulin colors by means of chloro-picric-acid (chloro-triniter-phenol). Besides the above methods employed in manufacture very many other ways of producing indulins are known; thus Nietzki mentions that indulins are formed, wherever para-substituted compounds of benzol are heated with monoamins in presence of small quantities of mineral acids, provided the necessary conditions for dehydrating prevail.

We have now found out that indulins may be produced in nearly the theoretical quantity, if aromatic amins are heated with halogen without any addition of acid. Compounds of anilin and halogen have been already produced often; for instance Hoffman prepared iodo-anilin from iodin and anilin, Kekule bromo-anilin, azoxy-benzene, etc. from anilin and bromin, Milles several kinds of chloro-anilin from anilin and chlorin. These former experiments did not result in producing indulinlike bodies probably because the savants did not heat the mixture during and after reaction. If heat is employed during the reaction a dirty brownish yellow or brownish red mass is generated containing when cold all kinds of products of the reaction, but not a vestige of indulin. If this mass is however gradually and very carefully heated again then indulin is formed. If however the mass that has been heated during the reaction and being still warm is raised to a temperature of 180° C. indulins are formed with the greatest ease. The liquid brown substance hardens and turns into a thick krypto-conglomerate of a bronze color, consisting chiefly of indulin and small quantities of amin, which did not enter into the reaction besides halogen-amin and halogenid of amin. As secondary products azo-phenin and traces of saffranin are formed. If only azo-phenin is to be produced the temperature must not be raised beyond 120 to 140° C. The product of the reaction is extracted with alcohol leaving the azo-phenin undissolved.

The following is an example of our process: Equal parts by weight of anilin and iodin are mixed at the usual temperature, the temperature of the mixture gradually rising of itself to about 70° C., while its originally brown color changes to ruby. The heating must be continued, the mass becoming thicker at about 100° C. and beginning to crystallize at 140° C. On reaching 180°, the reaction is at an end. The whole mass is kept for a short time at this temperature and then allowed to cool. When cool it is washed in the usual manner by diluted hydrochloric acid or by adding the calculated quantity of soda and distilling it with steam. Nearly the theoretical quantity of indulin is produced. The iodin used passes into the mother lye and can be easily regained therefrom. Iodin and anilin give the bluish violet indulin colors soluble in alcohol that are known in trade as "genuine blue soluble in alcohol" (*echt blau spiritlöslich*).

If chlorin is employed several methods are possible, for instance: Either anilin is heated under pressure with a quarter of its weight of chlorin to a temperature of 180° C. or gaseous chlorin is conducted into heated anilin and then the reaction is kept at about 180° by heating the mixture slightly. The chlorin that passes into the anilin is absorbed entirely, chlorin being conducted into the anilin till the melted mass has attained the desired color and consistency. The produce is high only chloro-anilin being formed as secondary product, which does not distil easily with steam. The fused mass is then alkalized with soda and distilled with steam.

The base thus isolated is dissolved in glacial acetic acid, the acetate of indulin dissolving in water with a pure deep blue color. Indulins are also formed by heating hydrochlorid of anilin ($C_6H_5NH_2.HCl$) or a mixture of the same parts by weight of anilin and hydrochlorid of anilin to a temperature of 180° C. and then conducting air into the melted mass. The same is the case, if the mixtures are treated with lead peroxid or persulfate or like substances. In this case, the oxygen of the air or of the oxidizing substance acts to liberate the halogen according to the following formula, but does not serve to oxidize the anilin, viz—

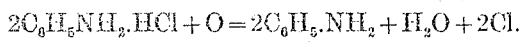

$$2C_6H_5NH_2.HCl + O = 2C_6H_5.NH_2 + H_2O + 2Cl.$$

The halogen thus freed reacts in *statu nascendi* upon the aromatic amin. The quantity of oxidizing substance to be used can be determined by calculation.

Another method is to pulverize and mix equal quantities by weight of hydrochlorid of anilin and lead peroxid and then to sprinkle the mixture with a little water or hydrochloric acid in order to cause the reaction to set in. The temperature of the mixture then gradually rises to about 100° C., the same becoming bright brown. It is then extracted with hot water for the purpose of removing the chlorid of lead that has been formed. The residue is then heated with hydrochlorid of anilin till a temperature of 180° is reached.

Instead of using halogens as was first described such substances may be employed that easily part with their halogen, for instance di-iodo-ethylene. It must be expressly mentioned that the production of indulins according to our process cannot be regarded as a process for oxidizing aromatic amin, because the whole of the reactions occur in the same manner in a current of carbonic acid, which precludes all substances giving off oxygen, thus proving that the reaction does not depend on an oxidation. Another proof that chlorin does not act oxidizing, if substances giving off oxygen are excluded is found for instance in the fact, that chlorin does not oxidize benzene to quinon but far more reduces it to hexachlorohydro-benzene giving off hydrochloric acid. Neither is it possible to obtain phthalic acid by treating naphthalene by chlorin as only chloro-naphthalenes are formed in this manner that may be oxidized with the help of nitric acid to phthalic acid.

We are of opinion, that the reactions of our process may be defined thus: First, an atom of chlorin is added in the para-position to the amid and another atom of chlorin to the carbon of the amid. The latter atom of chlorin forms hydrochloric acid with an atom of hydrogen and this evaporating allows the rest of the molecule to react with another molecule of amin thus forming the indulin.

The colors produced by our process are doubtless indulins possessing as they do all the qualities of said colors. The indulin color produced with the aid of iodin is far redder and that produced with the aid of chlorin far deeper blue than the indulins now on sale. The colors all contain a very small quantity of halogen.

What we claim as our invention and desire to secure by Letters Patent is:

1. A process for producing indulin and indulin like colors, consisting in heating an aromatic amin with halogen to about 180° C., substantially as described.

2. A process for producing indulin and indulinlike colors, which consists in heating an aromatic amin with a substance which readily yields chlorin to a temperature sufficient to cause said substance to part with chlorin, substantially as described.

3. A process for producing indulin and indulinlike colors, consisting in treating a fused hydrohalogenid of an aromatic amin with an oxidizing substance, substantially as described.

4. A process for producing indulin and indulinlike colors, consisting in treating a fused hydrohalogenid of an aromatic amin with air, substantially as described.

5. A process for producing indulin and indulinlike colors, consisting in treating a mixture of fused aromatic amin and a hydrohalogenid of an aromatic amin with an oxidizing substance, substantially as described.

6. A process for producing indulin and indulin like colors consisting in treating a mixture of fused aromatic amins and a hydrohalogenid of an aromatic amin with air, substantially as described.

In witness whereof, we subscribe our signatures, in the presence of two witnesses.

ADRIANO OSTROGOVICH.
TH. SILBERMANN.

Witnesses to signature of Ostrogovich:
  V. GRINDEANN,
  TEODOR SAIDEL.

Witnesses to signature of Silbermann:
  M. ODOBESEN,
  A. FOCTENEANN.